Oct. 15, 1963 R. STAEGER 3,106,948
JUICE EXTRACTOR COMBINED WITH A SHREDDER
Filed May 18, 1960

INVENTOR
RUDOLF STAEGER

United States Patent Office 3,106,948
Patented Oct. 15, 1963

3,106,948
JUICE EXTRACTOR COMBINED WITH
A SHREDDER
Rudolf Staeger, Hamburg, Germany, assignor to
Albert Stulz, Hamburg-Niendorf, Germany
Filed May 18, 1960, Ser. No. 29,844
Claims priority, application Germany May 20, 1959
5 Claims. (Cl. 146—76)

This invention relates to a device which can selectively shred fruit or extract juice from fruit.

It is an object of the invention to provide a device which will efficiently shred fruit or extract juice by the simple substitution of cutting tools.

In conventional juice and shredder devices a rotating disc induces a centrifugal air stream which causes undesirable splashing of juice and shredded material resulting in a loss of the product and an untidy appearance.

It is a further object of the invention to eliminate the adverse effects of the centrifugal air stream by controlling the same.

It is another object of the invention to utilize a centrifugal air stream to effect the uniform discharge of the juice and shredded fruit.

An embodiment of the invention is illustrated in the accompanying drawing in which.

Figure 1:
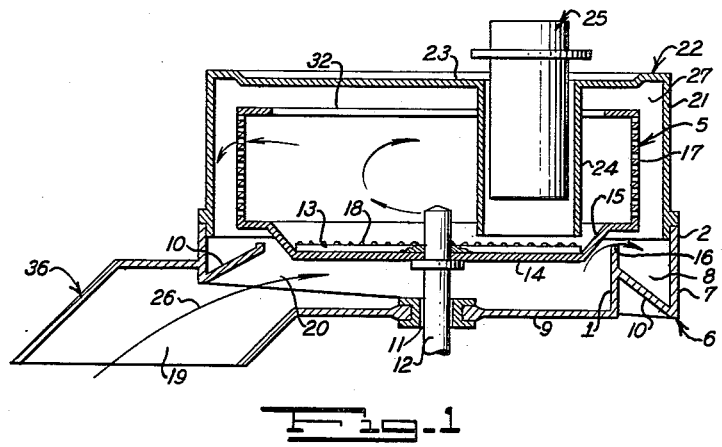
FIG. 1 is an axial section of a fresh juice centrifuge taken along line I—I of FIG. 2.
Figure 2:
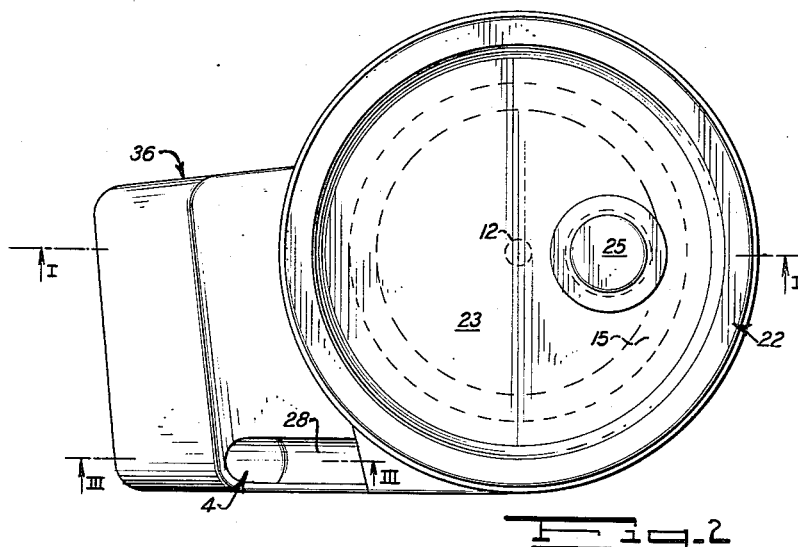
FIG. 2 is a top view of the fresh juice centrifuge according to FIG. 1 with the cover in place.

Referring to the embodiment in the drawing a housing 6 has an outer cylindrical wall or flange 7. Concentric and interiorly of flange 7 is a further wall or flange 1 which extends normal to the bottom 9 of the housing 6. The concentric flanges form an annular channel or passageway 8. The annular chamber 8 has a bottom portion 10 which slopes downwardly and which terminates at its lower end into an outlet 4 which constitutes a juice outlet.

A shaft 12 is adapted for being driven by an electric motor (not shown) and extends through a center opening 11 in the bottom 9 of housing 6. A screening drum 5 is adapted for being supported on the upper end of the shaft. Attached to the drum on the inside thereof at the bottom 14 is a dejuicer disc provided with a plurality of teeth 18. The dejuicer disc can be attached to the drum in any known manner, such as riveting, welding, brazing or the like. The bottom 14 of the screening drum is formed with a step adjacent the outer cylinder wall 17 of the drum. Step 15 extends over the top edge 16 of the flange 1 in spaced relation. The perforated wall 17 of the screening drum 5 projects radially outwardly of flange 1 to a position over the passageway 8.

Adjacent the relatively narrow outlet 4 is an outlet opening 19 of substantially larger size than the outlet 4. The opening 19 and outlet 4 are provided in projection 36 which extends outwardly of the outer flange 7. Opening 19 extends obliquely outwardly and downwardly. Opening 19 extends into the inner portion of the housing through opening 20 of the bottom 9 of housing 6.

If it is desired to utilize the device for a shredding operation instead of as a juice extractor, the screening drum 5 is removed from shaft 12 and is replaced by a shredding disc which is not shown in the drawing.

The housing 6 is closed at the top by an easily attachable cover 22 which has a cylindrical wall 21 that is adapted to engage flange 2. An annular flange 24, defining a filling opening, extends normal to the upper surface 23 of cover 22 and projects eccentrically into the interior of the housing to a position which is adjacent the juicer disc 13. A plug 25 can be introduced into the cover.

The operation of the device is as follows:

In order to operate the centrifuge as a juice extractor, the screening drum 5 with the dejuicer disc 13 is placed on drive shaft 12. The cover 23 is placed on flange 2 and the electric motor is started. The material from which the juice is to be extracted is introduced through the filling opening and is pressed by plug 25 against the rotating dejuicer disc. The material is crushed and torn by the dejuicer disc to form juice and pulp which is urged by centrifugal force against the cylinder wall 17 of the screening drum 5.

The outer cylinder wall 17 is provided with a plurality of fine holes to enable the juice to escape therethrough. The juice flows along the inside of the cylindrical wall 21 into channel 8. The juice then flows in channel 8 towards the outlet 4, which is located at the lowest end of the channel by virtue of the helically sloping shape of bottom portion 10 of channel 8. The flow is reinforced by the air current which circulates within the housing due to the rotation of the screening drum, the air acting by friction on the surface of the juice in channel 8. The screening drum rotates in the same direction as the slope of bottom portion 10, to reinforce the flow of the juice. It is important to note that the air does not enter the interior of the housing through the outlet 4, but rather through the large opening 19. The direction of air flow in opening 19 is shown in the direction of arrow 26 in FIG. 1. The air passes between the step 15 on the bottom 14 of the screening drum and the upper edge 16 of flange 1 into the annular space 27 between the outer cylinder wall 17 of the screening drum 5 and the cylindrical wall 21 of cover 22.

Figure 3:
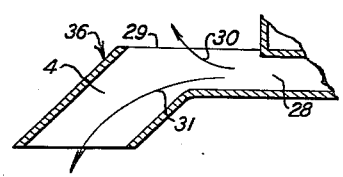
FIG. 3 is a vertical section through a portion of the fruit juice centrifuge taken along line III—III of FIG. 2.

In order to avoid a discharge of the juice at too high a pressure from the outlet 4 in the direction of arrow 31 in FIG. 3, the outlet 4 in projection 36 is placed tangentially outwardly to such an extent that the channel 8 is provided with a free opening 29 extending upwardly as shown in FIG. 3. Consequently, the high velocity air is enabled to escape through opening 29, as shown by arrow 30.

The pulp which is gradually accumulated inside the screening drum during the extraction of the juice is removed from the drum opening 32 after the motor has been stopped and the cover removed.

What is claimed is:

1. A juice extractor comprising a housing including spaced peripheral walls defining an annular passageway, the housing including a bottom connected to said walls sloping downwardly along said passageway and terminating in a lowermost portion, the housing being provided with an opening at said lowermost portion in communication with said passageway and constituting a juice outlet, means for extracting juice from material which is introduced into the extractor and comprising a drum including a bottom portion extending over one of said walls to define a space therebetween, said drum including a perforated wall extending upwardly from said bottom portion over said passageway, said housing being provided with an opening beneath said drum separate and apart from said juice outlet and of substantially greater size than the juice outlet, said drum being adapted for rotation in the direction of downward slope of the bottom of the passageway and effective to draw air into said passageway via said opening beneath said drum through the space between the bottom of the drum and said one wall and cause rotation of the air in said passageway in the direction of downward slope to reinforce the downward flow of juice in said passageway.

2. Apparatus as claimed in claim 1 wherein said walls defining the annular passageway are circular in extent and are peripherally located in the housing, said drum being also of circular extent and substantially adapted for being supported in said housing concentrically with said walls.

3. Apparatus as claimed in claim 1 wherein the opening constituting the juice outlet is steeply inclined in a downwardly direction relative to the passageway, said body being provided with a second opening spaced above said juice outlet to allow outflow of air from the passageway.

4. Apparatus as claimed in claim 1 comprising a cover adapted for being detachably supported on the housing and for enclosing the drum, said cover being provided with an opening to permit the charging of material to said drum.

5. Apparatus as claimed in claim 4 wherein the other of said walls constitutes an outer wall of said housing, the cover being adapted for being supported on the outer wall, said housing including a projection outwardly extending beyond the outer wall, the projection being provided with the juice outlet opening and the opening which communicates with the compartment, the latter said openings being separate and independent of one another in said projection.

References Cited in the file of this patent

UNITED STATES PATENTS

| | | |
|---|---|---|
| 2,273,093 | Drachenberg | Feb. 17, 1942 |
| 2,840,130 | Schwarz | June 24, 1958 |
| 2,840,318 | Schnell | June 24, 1958 |
| 2,870,653 | Koenig | Jan. 27, 1959 |
| 2,971,649 | Henzirohs | Feb. 14, 1961 |